(12) United States Patent
Harris et al.

(10) Patent No.: US 8,561,821 B2
(45) Date of Patent: Oct. 22, 2013

(54) HEAT SET CONTAINER

(75) Inventors: Ivan Harris, Ypsilanti, MI (US);
Ricardo Sandoval, Manchester, MI (US); Luke A. Mast, Brooklyn, MI (US)

(73) Assignee: Amcor Limited, Hawthorn (AU)

( * ) Notice: Subject to any disclaimer, the term of this patent is extended or adjusted under 35 U.S.C. 154(b) by 276 days.

(21) Appl. No.: 13/005,570

(22) Filed: Jan. 13, 2011

(65) Prior Publication Data
US 2011/0168662 A1 Jul. 14, 2011

Related U.S. Application Data

(60) Provisional application No. 61/294,904, filed on Jan. 14, 2010.

(51) Int. Cl.
*B65D 90/02* (2006.01)

(52) U.S. Cl.
USPC ........... 215/381; 215/383; 215/384; 215/382; 220/660; 220/666; D9/516; D9/522; D9/546; D9/556

(58) Field of Classification Search
USPC ......... 215/379, 381, 382; 428/36.92; D9/516, D9/522, 541, 546, 556
See application file for complete search history.

(56) References Cited

U.S. PATENT DOCUMENTS

| | | | | |
|---|---|---|---|---|
| D124,939 S | * | 1/1941 | Noble | D9/556 |
| D141,023 S | * | 4/1945 | Kunett | D9/522 |
| D202,222 S | * | 9/1965 | Heintze | D9/546 |
| 4,497,855 A | | 2/1985 | Agrawal et al. | |
| 4,749,092 A | * | 6/1988 | Sugiura et al. | 215/381 |
| 6,837,390 B2 | * | 1/2005 | Lane et al. | 215/381 |
| D581,803 S | * | 12/2008 | Lepoitevin | D9/556 |
| 7,571,827 B2 | * | 8/2009 | Haley et al. | 215/381 |
| 2007/0257004 A1 | * | 11/2007 | Howell et al. | 215/383 |
| 2010/0155360 A1 | * | 6/2010 | Mast et al. | 215/383 |
| 2011/0168662 A1 | * | 7/2011 | Harris et al. | 215/381 |

FOREIGN PATENT DOCUMENTS

| | | |
|---|---|---|
| JP | 60-175015 | 11/1985 |
| JP | 63-070913 | 5/1988 |
| JP | 06-336239 | 12/1994 |
| JP | 2006-151488 | 6/2006 |

OTHER PUBLICATIONS

International Search Report and Written Opinion dated Sep. 20, 2011 from corresponding International Patent Application No. PCT/US2011/021063 (eight pages).

* cited by examiner

*Primary Examiner* — Anthony Stashick
*Assistant Examiner* — Cynthia Collado
(74) *Attorney, Agent, or Firm* — Harness, Dickey & Pierce, P.L.C.

(57) ABSTRACT

A heat set container including a base portion, a shoulder portion, and a sidewall portion extending from the shoulder portion to the base portion. The shoulder portion, the sidewall portion and the base portion cooperate to define a receptacle chamber within the container into which product can be filled. A plurality of vacuum panels are equidistantly disposed about the sidewall portion. A plurality of transition lands are disposed between adjacent ones of the plurality of vacuum panels and spaced outwardly relative thereto. The plurality of vacuum panels and the plurality of transition lands cooperate to be inwardly collapsible from a first outside diameter to a second outside diameter in response to at least internal vacuum forces.

7 Claims, 14 Drawing Sheets

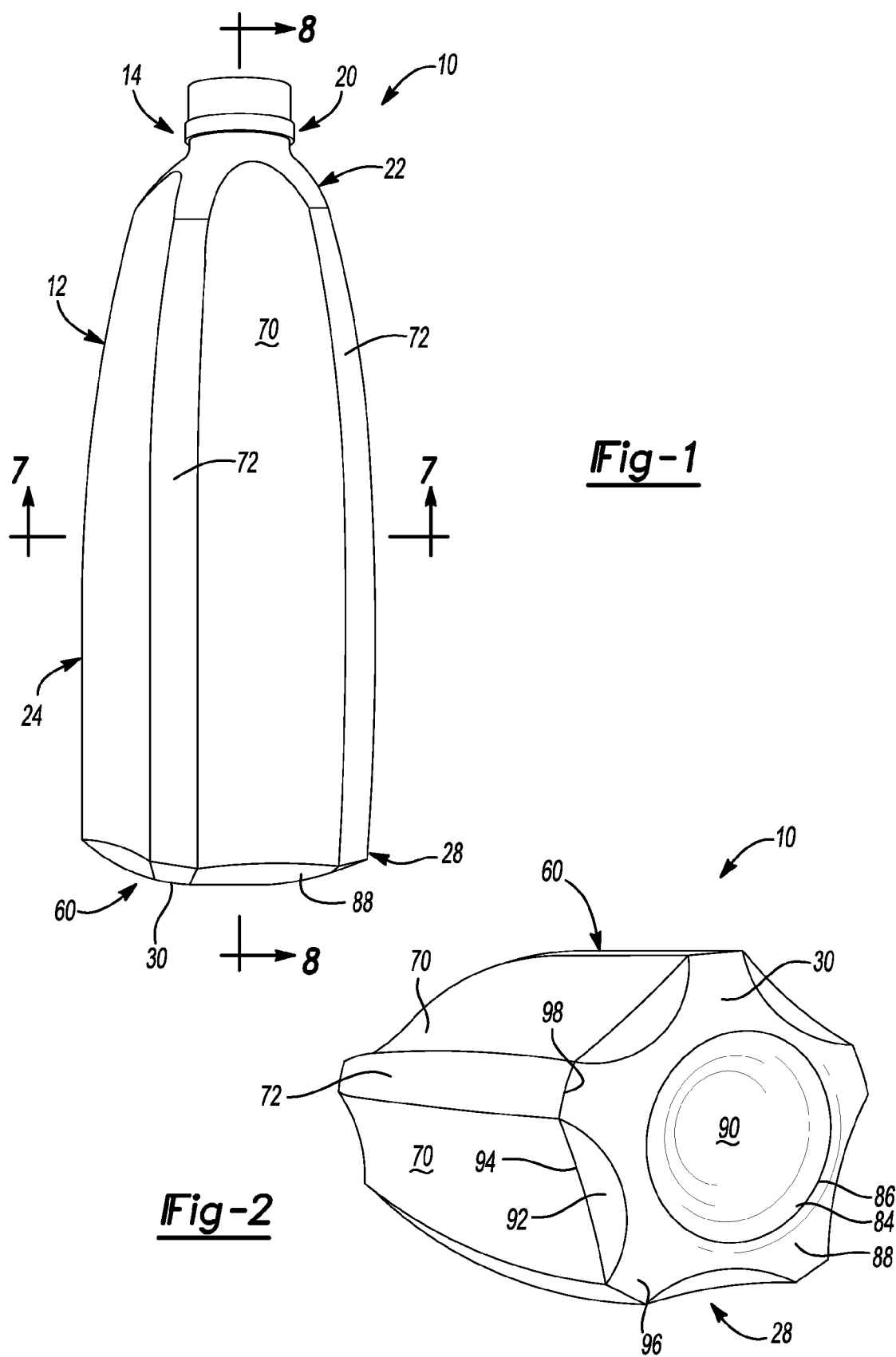

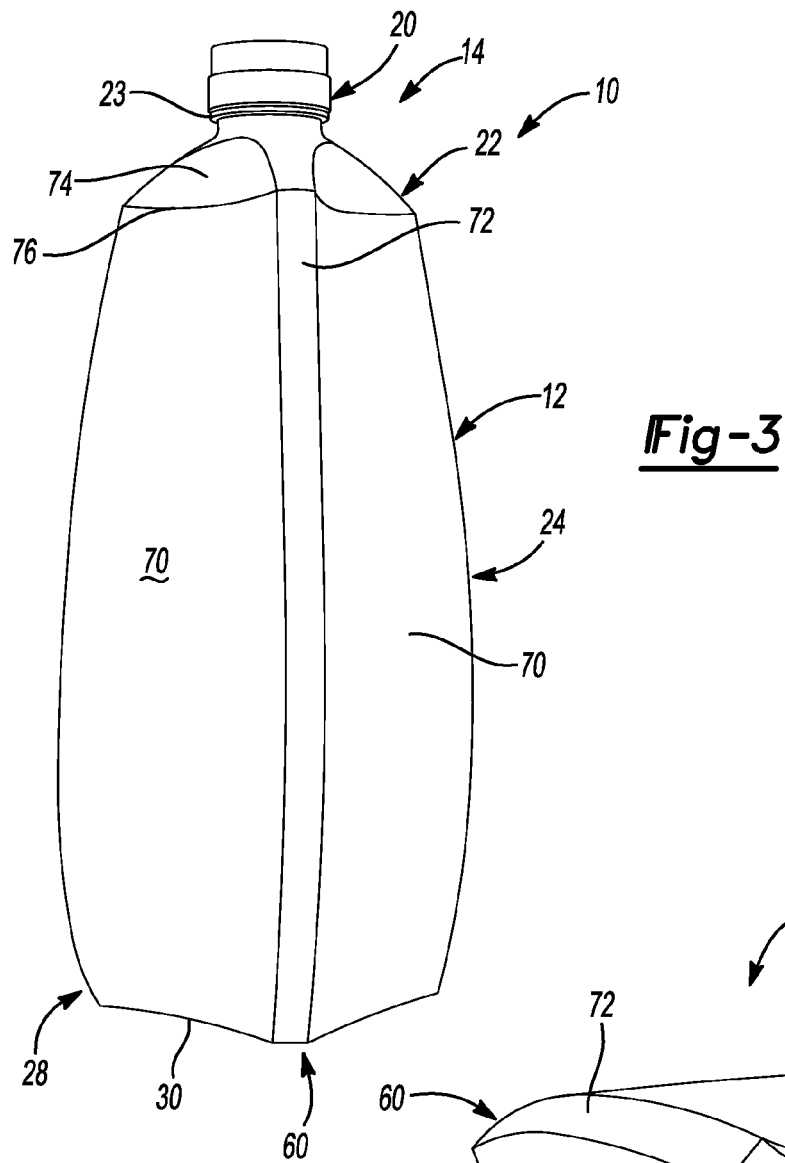
_Fig-3_
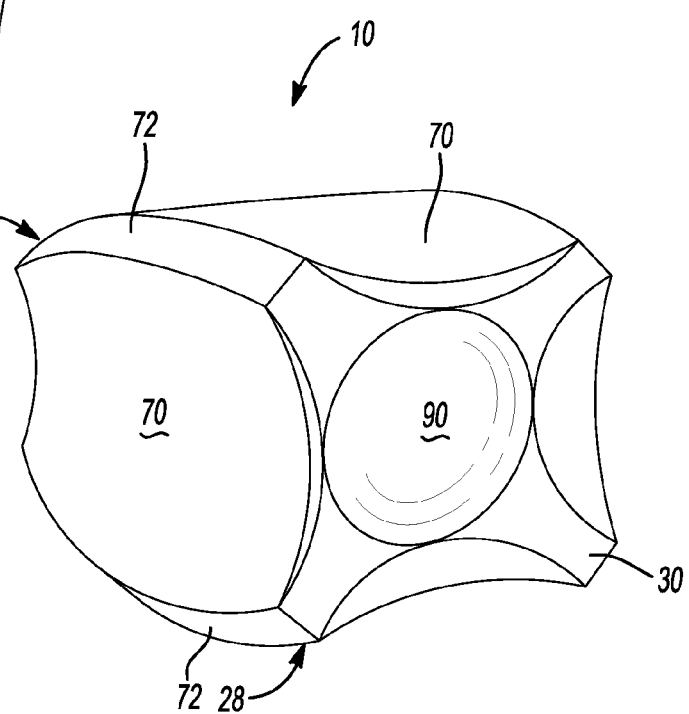
_Fig-4_

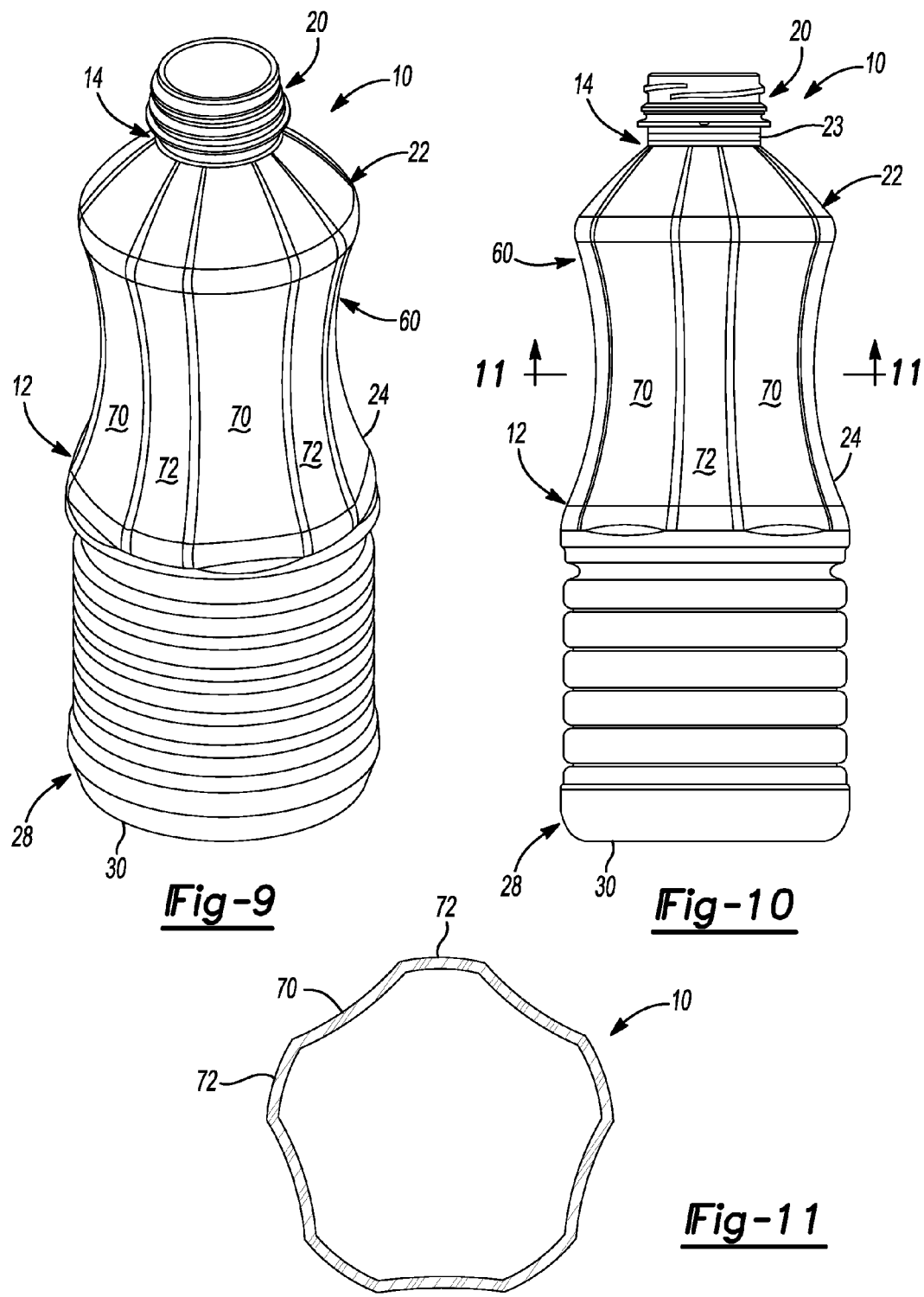

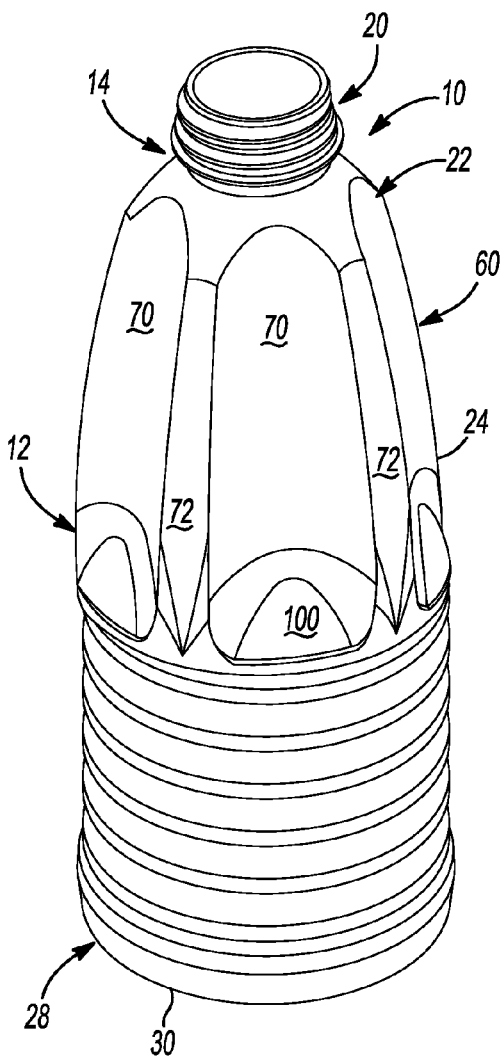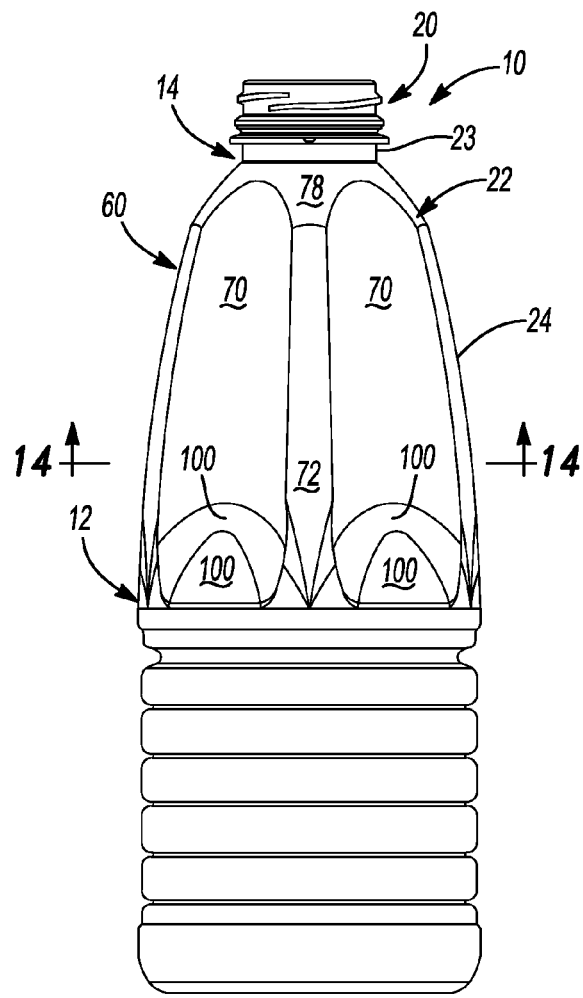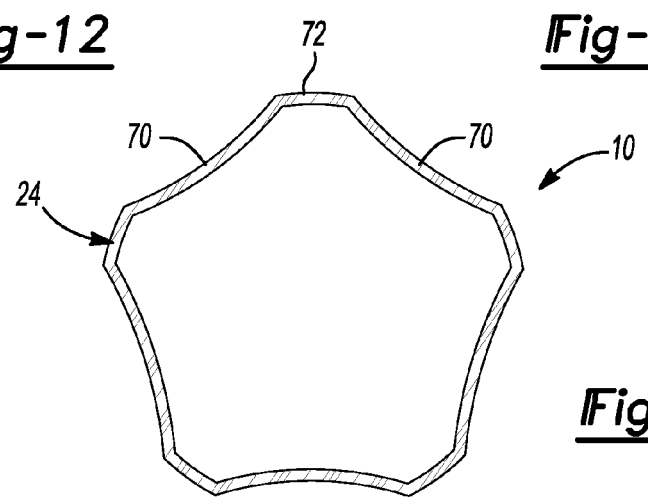
Fig-12
Fig-13
Fig-14

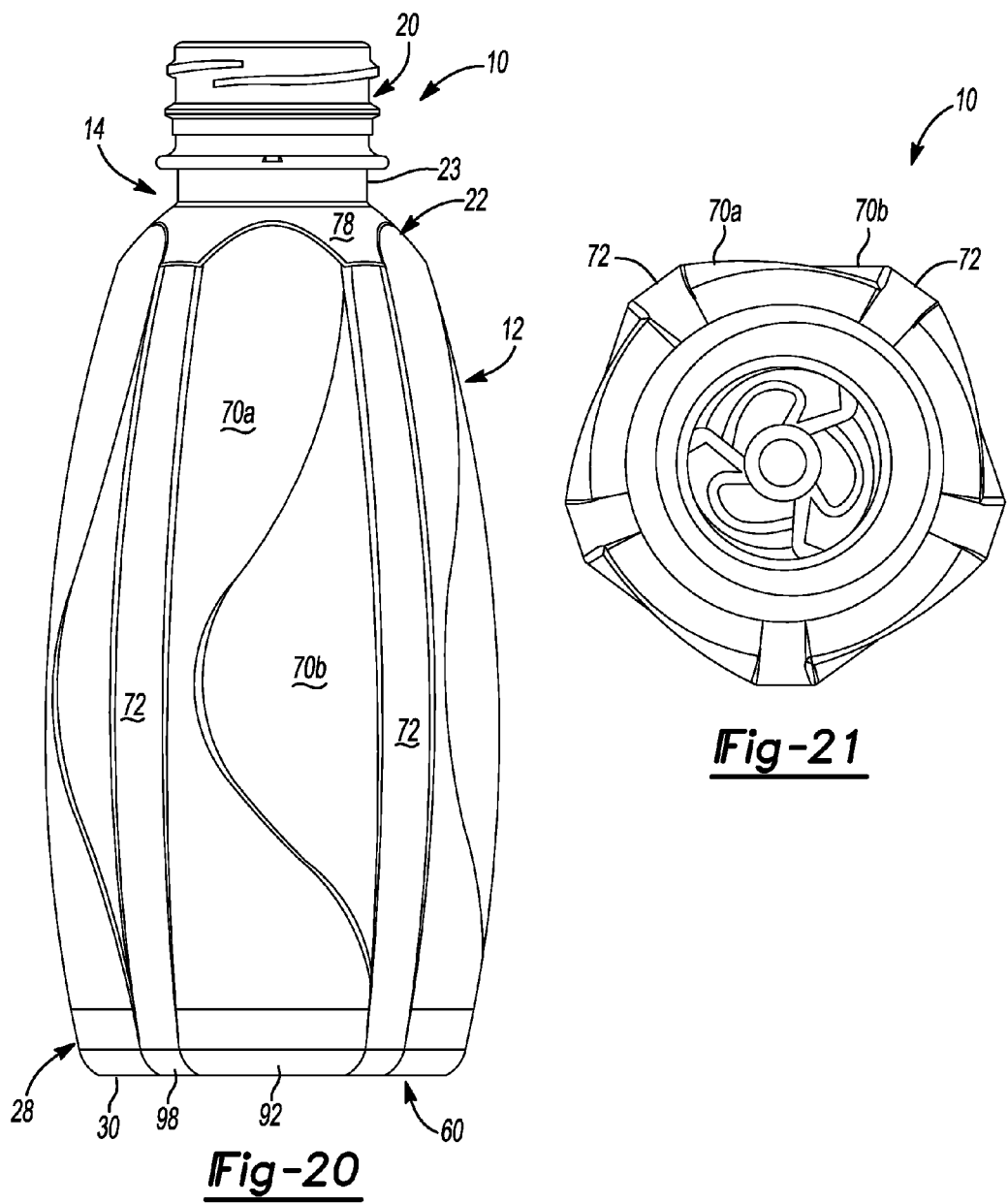

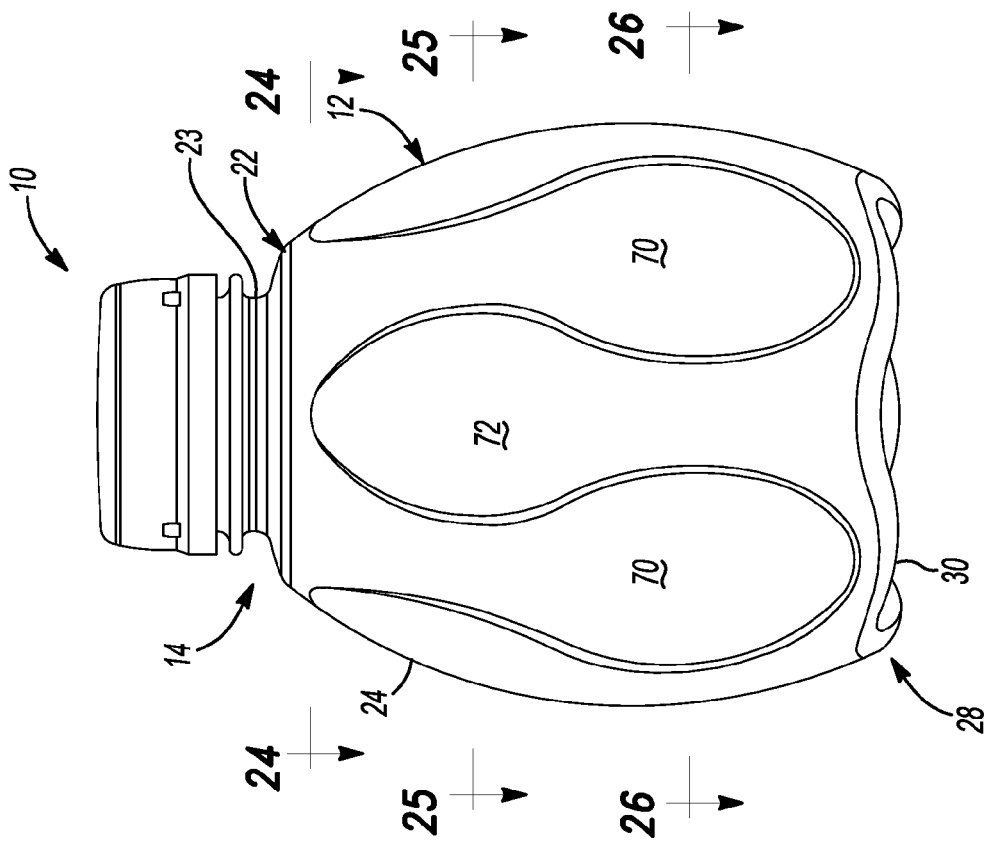
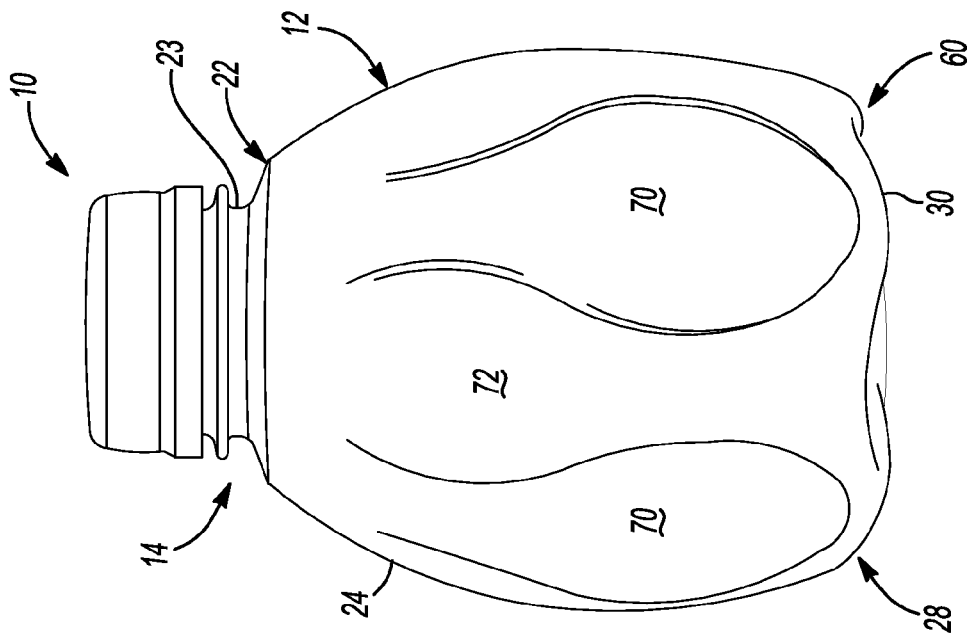

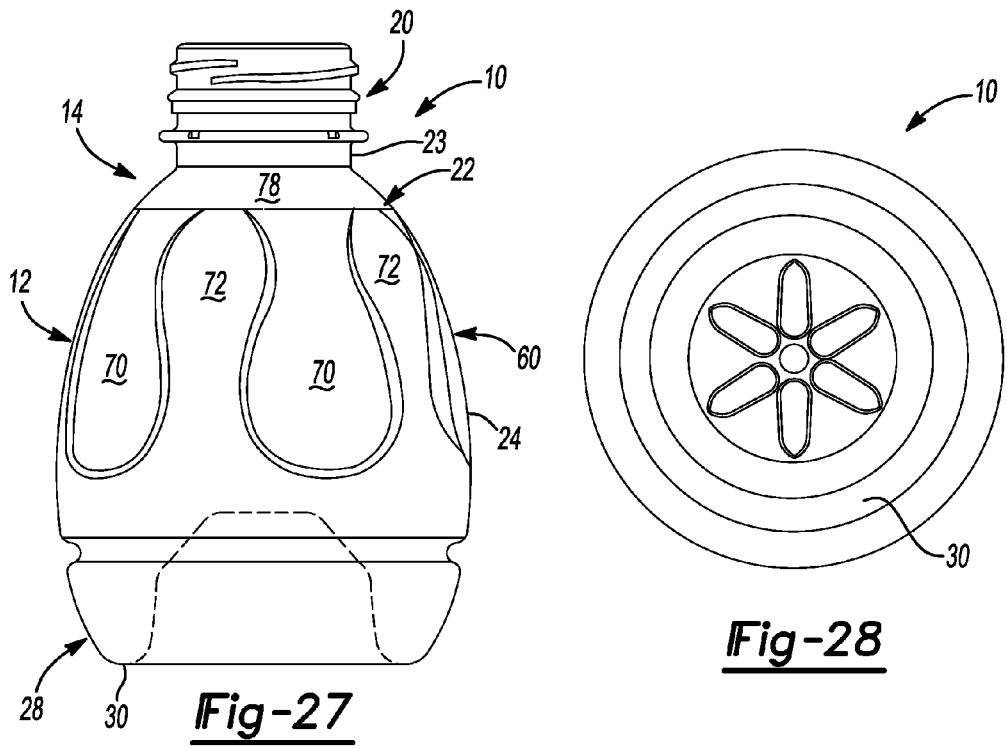
*Fig-27*
*Fig-28*
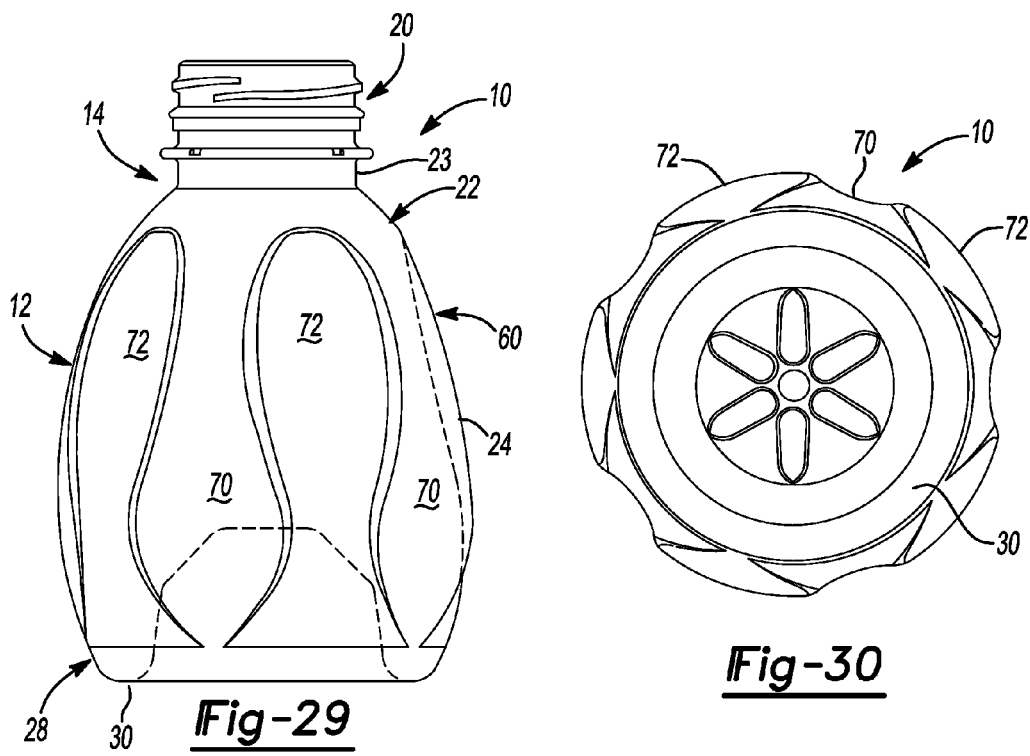
*Fig-29*
*Fig-30*

HEAT SET CONTAINER

CROSS-REFERENCE TO RELATED APPLICATIONS

This application claims the benefit of U.S. Provisional Application No. 61/294,904, filed on Jan. 14, 2010. The entire disclosure of the above application is incorporated herein by reference.

FIELD

This disclosure generally relates to containers for retaining a commodity, such as a solid or liquid commodity. More specifically, this disclosure relates to a heat-set, polyethylene terephthalate (PET) container having a plurality of vertically oriented collapsible rib features capable of forming a reinforced container when under vacuum.

BACKGROUND

This section provides background information related to the present disclosure which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

SUMMARY

This section provides a general summary of the disclosure, and is not a comprehensive disclosure of its full scope or all of its features.

According to the principles of the present teachings, a heat set container is provided having a base portion, a shoulder portion, and a sidewall portion extending from the shoulder portion to the base portion. The shoulder portion, the sidewall portion and the base portion cooperate to define a receptacle chamber within the container into which product can be filled. A plurality of vacuum panels are equidistantly disposed about the sidewall portion, wherein, in some embodiments, each of the plurality of vacuum panels is concave when viewed in cross-section. A plurality of transition lands are disposed between adjacent ones of the plurality of vacuum panels and spaced outwardly relative thereto. In some embodiments, each of the plurality of vacuum panels is generally flat having concave transition lands therebetween. The plurality of vacuum panels and the plurality of transition lands cooperate to be inwardly collapsible from a first outside diameter to a second outside diameter in response to at least internal vacuum forces.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a front view of a plastic container constructed in accordance with some embodiments of the present disclosure;

FIG. 2 is a bottom perspective view of the container of FIG. 1;

FIG. 3 is a front view of a plastic container constructed in accordance with additional embodiments of the present disclosure;

FIG. 4 is a bottom perspective view of the container of FIG. 3;

FIG. 9 is a perspective view of a plastic container constructed in accordance with some embodiments of the present disclosure;

FIG. 10 is a front view of the container of FIG. 9;

FIG. 11 is a cross-section view of the container taken along line 11-11 of FIG. 10;

FIG. 12 is a perspective view of a plastic container constructed in accordance with some embodiments of the present disclosure;

FIG. 13 is a front view of the container of FIG. 12;

FIG. 14 is a cross-section view of the container taken along line 14-14 of FIG. 12;

FIG. 20 is a front view of a plastic container constructed in accordance with some embodiments of the present disclosure;

FIG. 21 is a bottom view of the container of FIG. 20;

FIG. 22 is a front view of a plastic container constructed in accordance with some embodiments of the present disclosure;

FIG. 23 is a side view of the container of FIG. 22;

FIG. 27 is a front view of a plastic container constructed in accordance with some embodiments of the present disclosure;

FIG. 28 is a bottom view of the container of FIG. 27;

FIG. 29 is a front view of a plastic container constructed in accordance with some embodiments of the present disclosure;

FIG. 30 is a bottom view of the container of FIG. 29;

Corresponding reference numerals indicate corresponding parts throughout the several views of the drawings.

DETAILED DESCRIPTION

Figure 6:
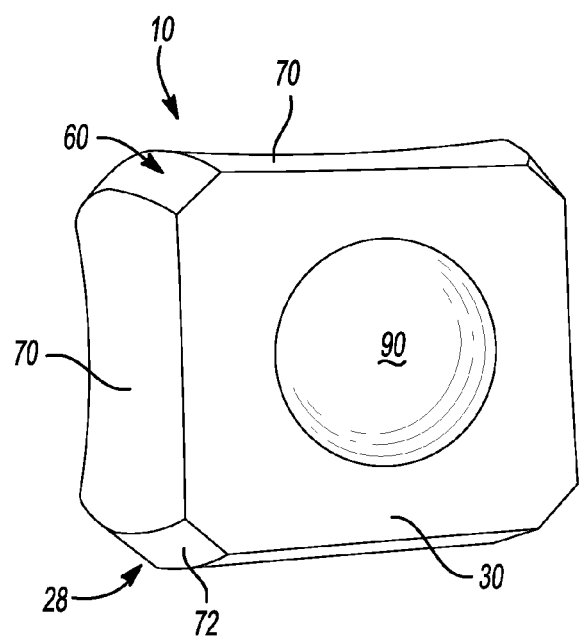
FIG. 6 is a bottom perspective view of the container of FIG. 5.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

This disclosure provides for a container having a flexible or collapsible base, sidewalls, and/or shoulder regions effectively absorbing the internal vacuum forces resulting from a hot-fill operation. The container of the present teachings controls and reduces residual internal forces, increases top-load capability, allows for material weight reduction, and provides improved ergonomic gripping. The container can be described as having a plurality of vertical columns extending substantially along its longitudinal length that are collapsible under vacuum to form a smaller and stronger container member.

It should be appreciated that the size and the number of vacuum panels and vertical columns are dependent on the size of the container and the required vacuum absorption. Therefore, it should be recognized that variations can exist in the present embodiments. Specifically, according to some embodiments, a single-serving container can comprise three vacuum panels extending longitudinally along the container and arranged about the circumference of the container. In alternative embodiments, additional vacuum panels can be used in a similar, equidistant arrangement.

As illustrated in FIGS. 1-34, the present teachings provide a one-piece plastic, e.g. polyethylene terephthalate (PET), container generally indicated at 10. The container 10 is substantially elongated when viewed from a side. Those of ordinary skill in the art would appreciate that the following teachings of the present disclosure are applicable to other containers, such as rectangular, triangular, pentagonal, hexagonal, octagonal, polygonal, or square shaped containers, which may have different dimensions and volume capacities. It is also contemplated that other modifications can be made depending on the specific application and environmental requirements.

As shown in FIGS. 1-34, the one-piece plastic container 10 according to the present teachings defines a body 12, and includes an upper portion 14 having a cylindrical sidewall forming a finish 20. Integrally formed with the finish 20 and extending downward therefrom is a shoulder portion 22. The shoulder portion 22 merges into and provides a transition between the finish 20 and a sidewall portion 24. The sidewall portion 24 extends downward from the shoulder portion 22 to a base portion 28 having a base 30. In some embodiments, sidewall portion 24 can extend down and nearly abut base 30, thereby minimizing the overall area of base portion 28 such that there is not a discernable base portion 28 when container 10 is uprightly-placed on a surface.

The exemplary container 10 may also have a neck 23 (FIG. 3). The neck 23 may have an extremely short height, that is, becoming a short extension from the finish 20, or an elongated height, extending between the finish 20 and the shoulder portion 22. The upper portion 14 can define an opening for filling and dispensing of a commodity stored therein. Although the container is shown as a drinking container, it should be appreciated that containers having different shapes, such as sidewalls and openings, can be made according to the principles of the present teachings.

Although not shown, the finish 20 of the plastic container 10 may include a threaded region having threads, a lower sealing ridge, and a support ring. The threaded region provides a means for attachment of a similarly threaded closure or cap (not illustrated). Alternatives may include other suitable devices that engage the finish 20 of the plastic container 10, such as a press-fit or snap-fit cap for example. Accordingly, the closure or cap (not illustrated) engages the finish 20 to preferably provide a hermetical seal of the plastic container 10. The closure or cap (not illustrated) is preferably of a plastic or metal material conventional to the closure industry and suitable for subsequent thermal processing.

Referring now to FIGS. 1-34, shoulder portion 22, sidewall portion 24, and base portion 28 of the present teachings will now be described in greater detail. As discussed herein, shoulder portion 22, sidewall portion 24, and base portion 28 can each separately, collectively, or in various combinations comprise vertically oriented collapsible columns 60. In some embodiments, the vertically oriented collapsible columns 60 can extend the length of the container (see FIGS. 1-8, 17-26, and 31-34), the associated section (i.e. shoulder portion 22, sidewall portion 24, and/or base portion 28; see FIGS. 12-16), and/or a subset portion of the container. The vertically oriented collapsible columns 60 can effectively absorb and/or aid in the absorbing of the internal vacuum resulting from hot-filling of a commodity into container 10 while collapsing in a direction orthogonal to a longitudinal axis of the container. Shoulder portion 22, sidewall portion 24, and base portion 28 can be arranged such that collapsible columns 60 are equidistantly arranged about container 10 when viewed from above. Such symmetrical arrangement provides aesthetic qualities and improves grip performance.

With continued reference to FIGS. 1-8, in some embodiments, collapsible columns 60 of shoulder portion 22, sidewall portion 24, and/or base portion 28 can each comprise a vacuum panel 70 having transition lands 72 disposed therebetween. Vacuum panels 70 each define a smooth surface that in some embodiments can extend uninterrupted from and including shoulder portion 22 to and including base portion 28. In some embodiments, vacuum panels 70 can each define a smooth surface that extends uninterrupted from and including sidewall portion 24 to and including base portion 28. Similarly, in some embodiments, vacuum panels 70 can each define a smooth surface that extends uninterrupted along sidewall portion 24.

In some embodiments, vacuum panels 70 can be generally continuous. That is, vacuum panels 70 can define an unobstructed surface, albeit flat, planar, arcuate, or otherwise contoured (see FIGS. 1, 3, 5, 10, 17, 22, and the like). However, in some embodiments, vacuum panels 70 can comprise one or more intersecting surfaces 70a, 70b (see FIG. 20) that can be joined to define a vacuum panel moveable in response to an applied vacuum force. Still further, it should be recognized that vacuum panels 70 and transition lands 72, in some embodiments, can be columnar shaped. Alternatively, in some embodiments, vacuum panels 70 and transition lands 72 can define a non-columnar shape, such as a droplet shape (see FIGS. 22-34).

Figure 7:
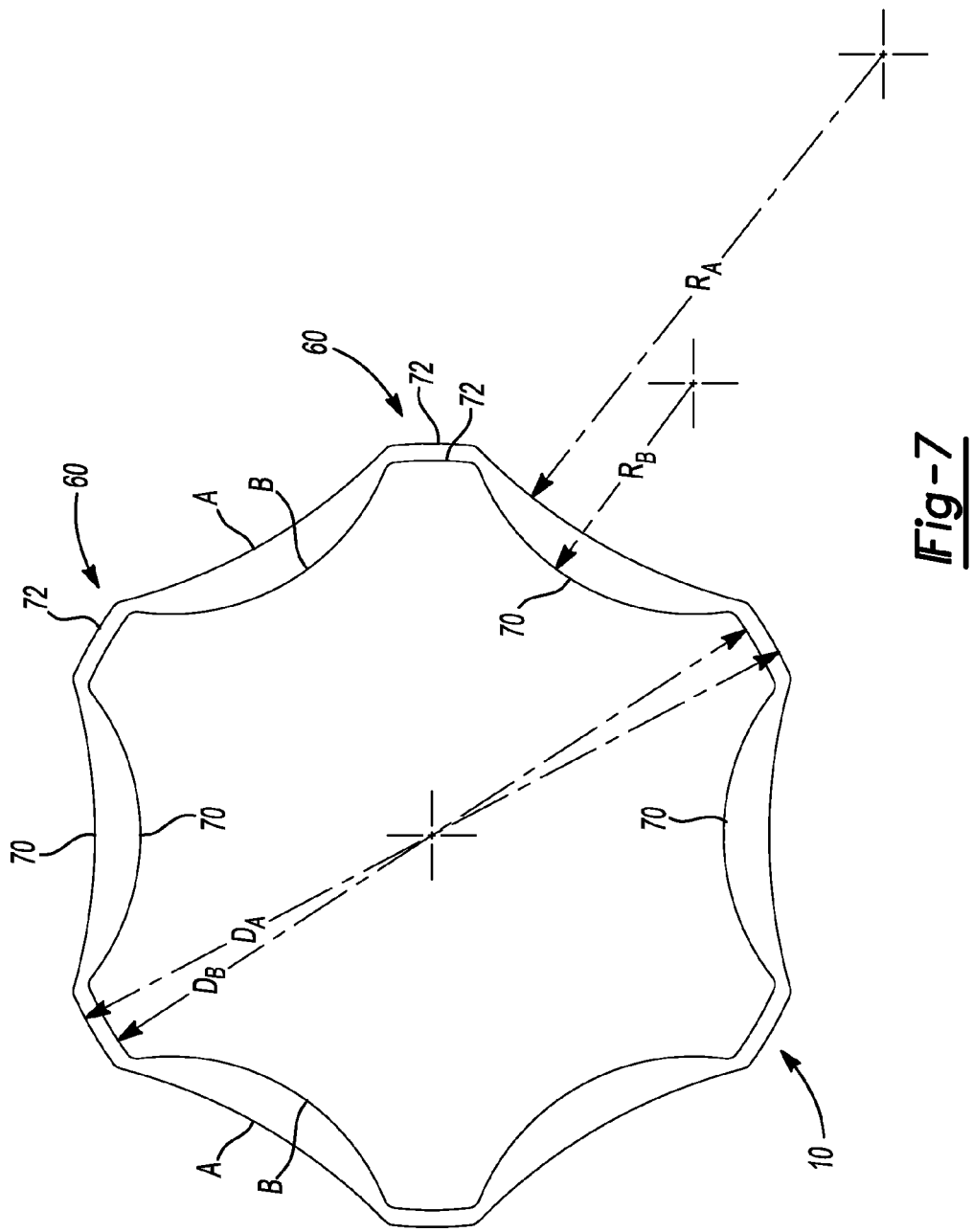
FIG. 7 is a schematic cross-sectional view of the container taken along line 7-7 of FIG. 1.
Figure 8:
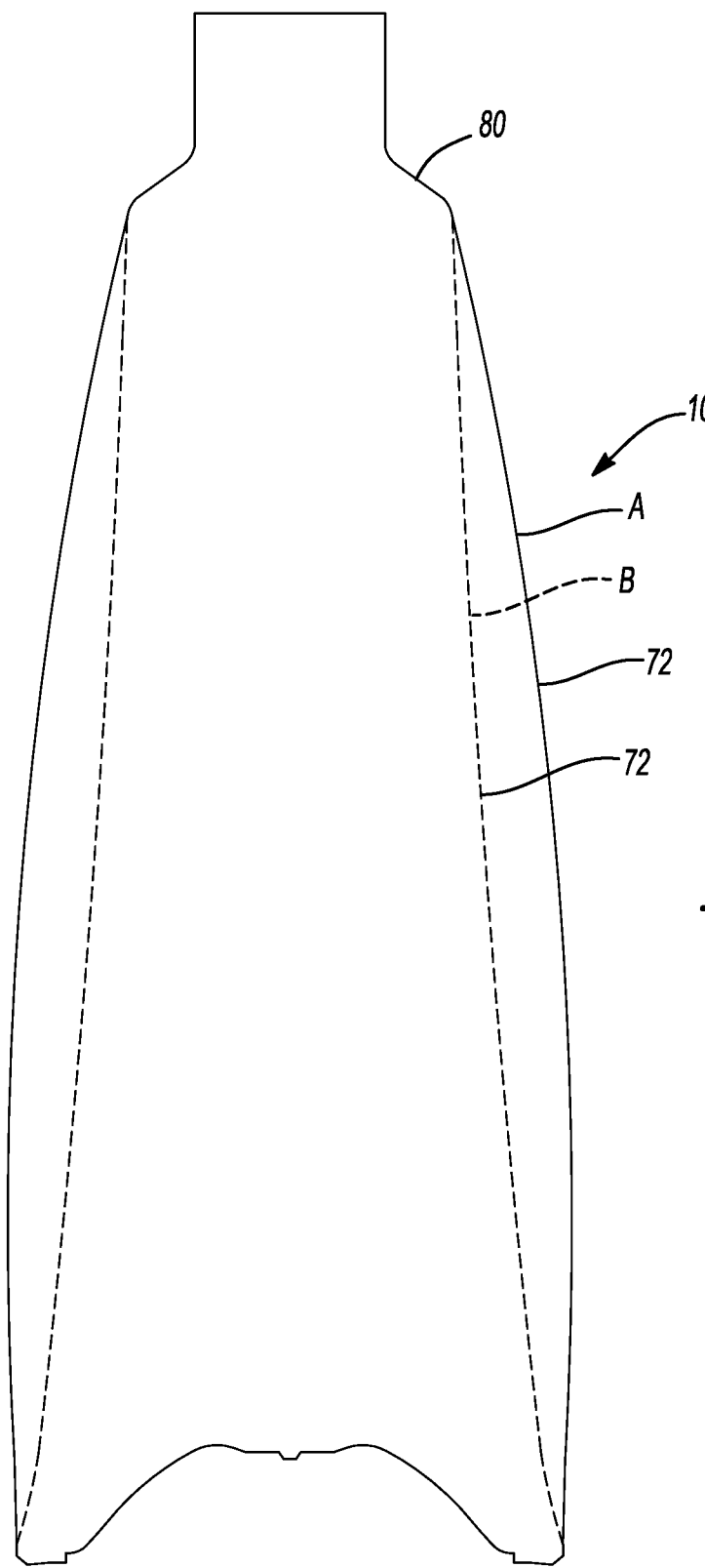
FIG. 8 is a schematic cross-sectional view of the container taken along line 8-8 of FIG. 1.
Figure 15:
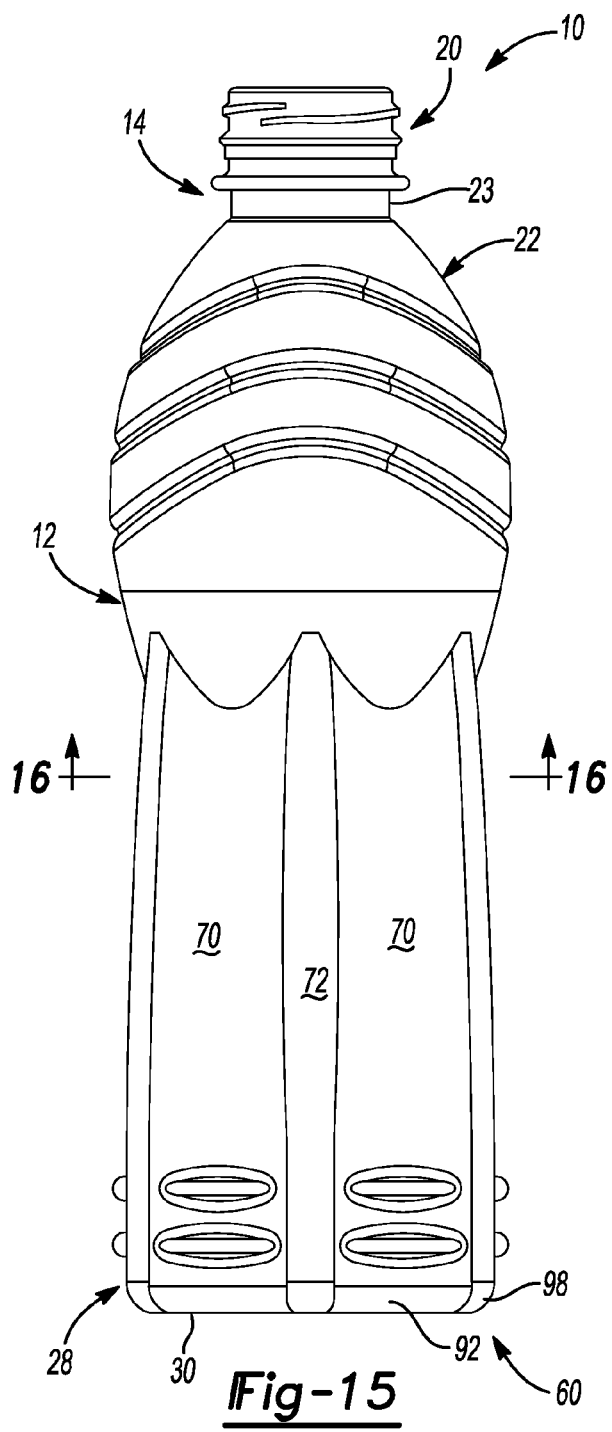
FIG. 15 is a front view of a plastic container constructed in accordance with some embodiments of the present disclosure.
Figure 16:
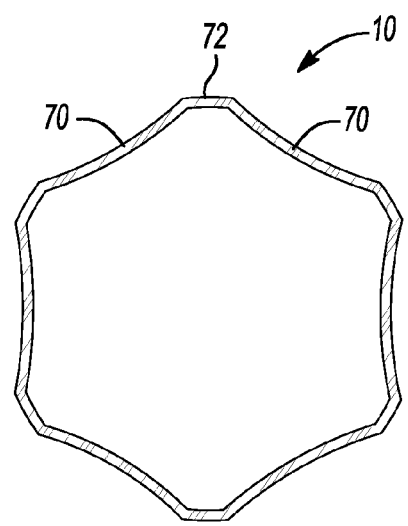
FIG. 16 is a cross-section view of the container taken along line 16-16 of FIG. 15.

In some embodiments, vacuum panels 70 can comprise an arcuate shape (i.e. concave or convex, or a combination thereof) or be generally flat when viewed from a side and a concave shape when viewed in cross-section (FIG. 7). With reference to FIG. 7, in some embodiments, vacuum panels 70 defines a first concave shape when in a first or relaxed condition (line A) and defines a second concave shape when in a flexed or under-vacuum condition (line B). In this way, the second concave shape can have a smaller radius $R_B$ that defines greater indenture compared to the larger radius $R_A$ of the first concave shape in response to vacuum forces. The smaller radius $R_B$ produces a greater concave response of vacuum panels 70 that produces an inwardly directed deflection of vacuum panels 70. This inwardly directed deflection causes transition lands 72 to correspondingly deflect inwardly (line B) compared to their relaxed condition (line A) causing the overall diameter of container 10 to reduce from an initial diameter $D_A$ to a final diameter $D_B$. This reduced diameter of $D_B$, irrespective of the specific outer shape of the container (i.e. pentagonal, hexagonal, etc.), increases hoop strength and thus results in improved vertical stiffness. The result is an increase in top-load strength that benefits secondary packaging and palletizing. That is, the smaller the diameter of container 10, the greater the top-loading capability.

Additionally, the reduced diameter $D_B$ and the increased defined angle between vacuum panels 70 and transition lands 72 promotes improved tactile quality and easier consumer handling.

Figure 17:
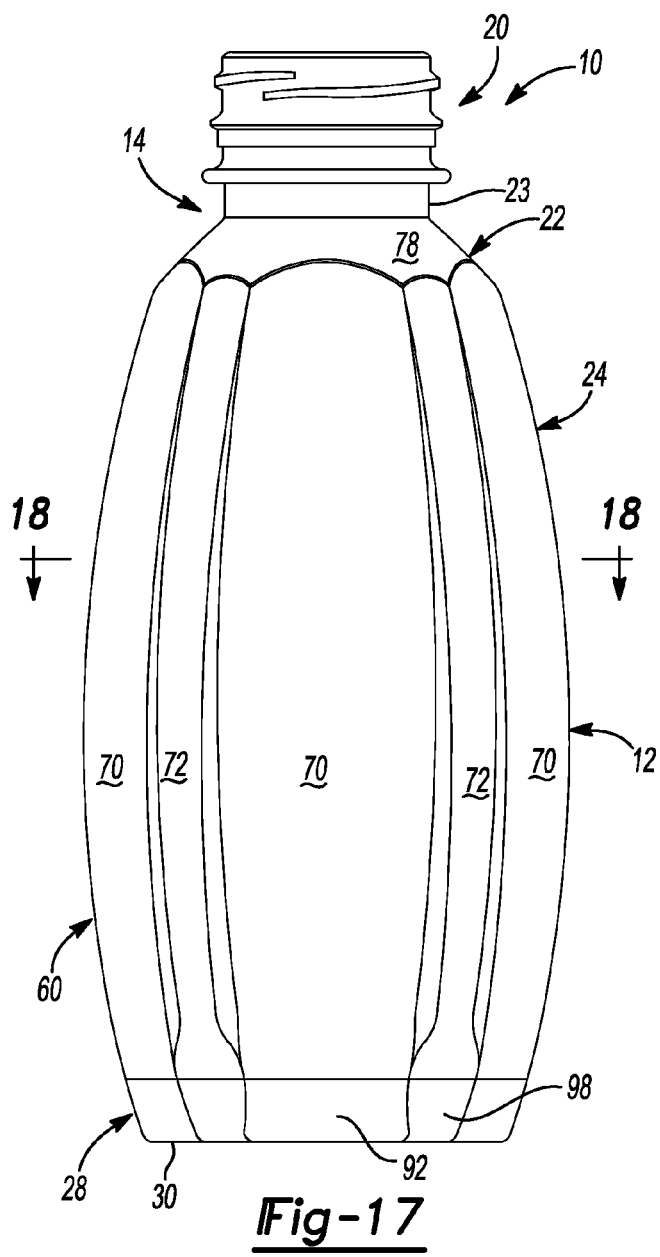
FIG. 17 is a front view of a plastic container constructed in accordance with some embodiments of the present disclosure.
Figure 18:
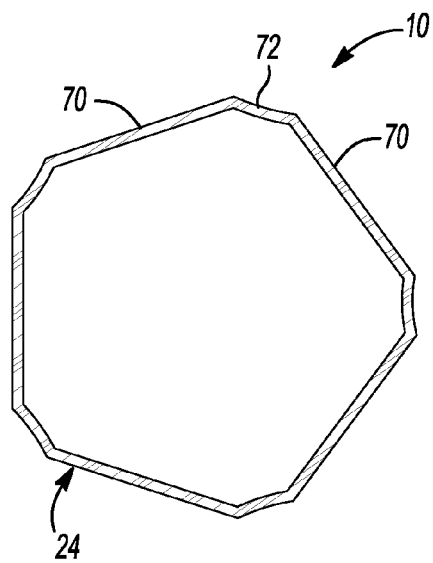
FIG. 18 is a cross-section view of the container taken along line 18-18 of FIG. 17 in a relaxed position.
Figure 19:
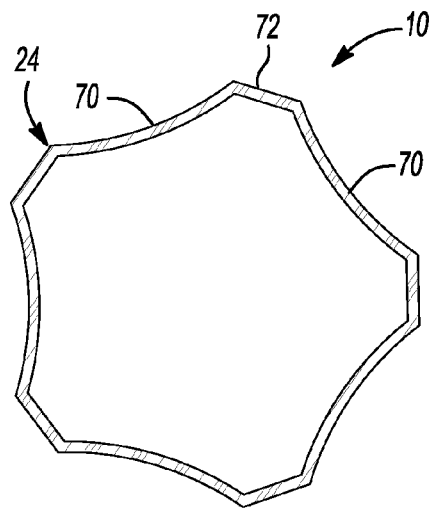
FIG. 19 is a cross-section view of the container taken along line 18-18 of FIG. 17 in a collapsed position.
Figure 24:
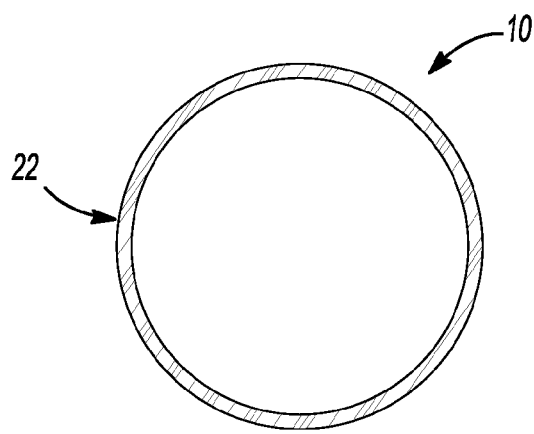
FIG. 24 is a cross-section view of the container taken along line 24-24 of FIG. 23.
Figure 25:
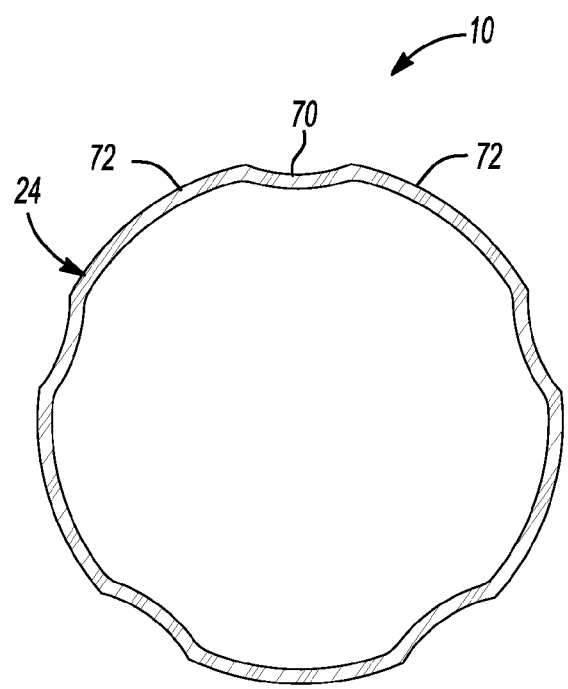
FIG. 25 is a cross-section view of the container taken along line 25-25 of FIG. 23.
Figure 26:
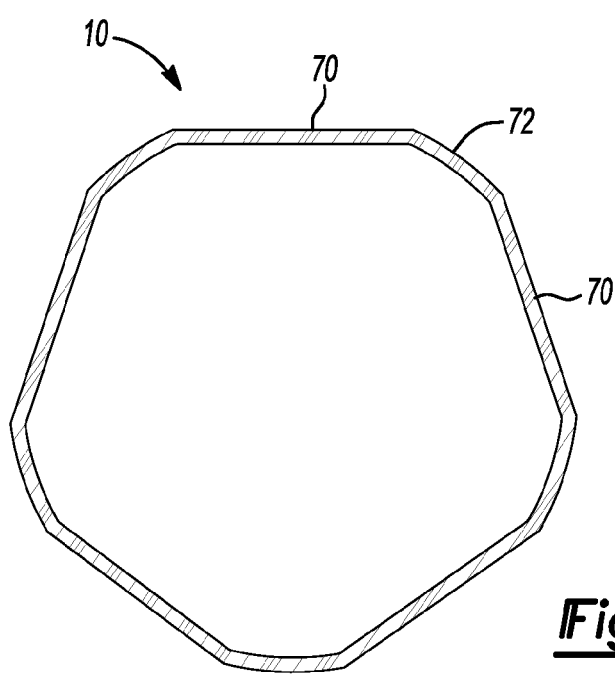
FIG. 26 is a cross-section view of the container taken along line 26-26 of FIG. 23.
Figures 31, 32:
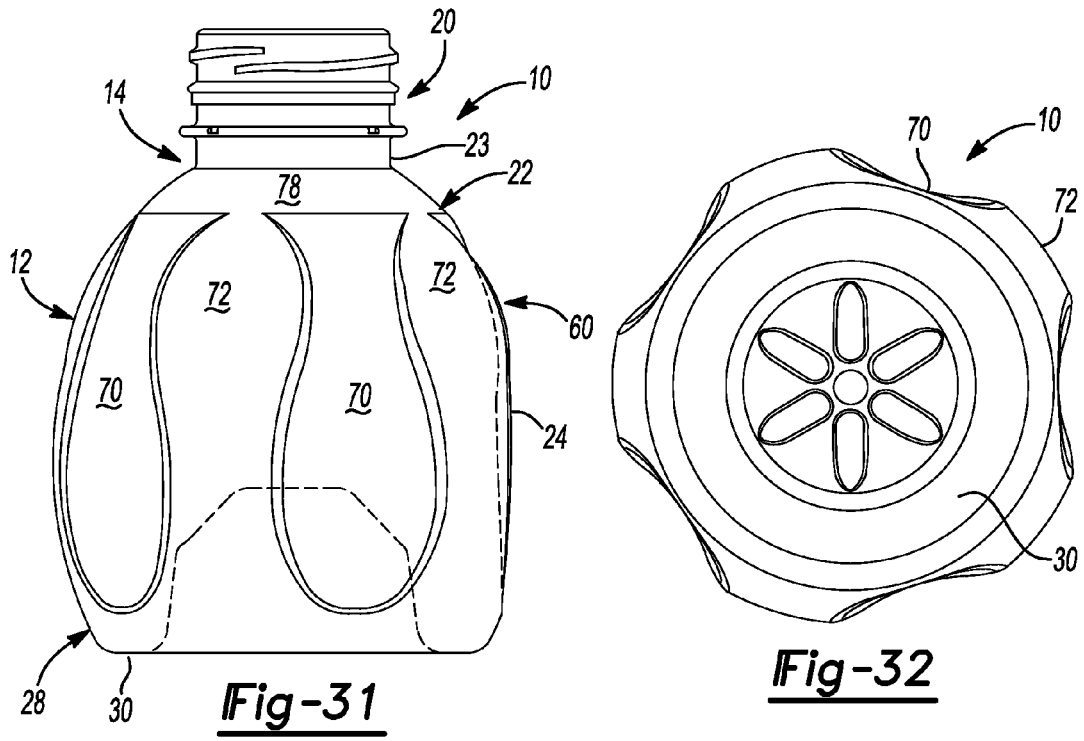
FIG. 31 is a front view of a plastic container constructed in accordance with some embodiments of the present disclosure.
FIG. 32 is a bottom view of the container of FIG. 31.
Figures 33, 34:
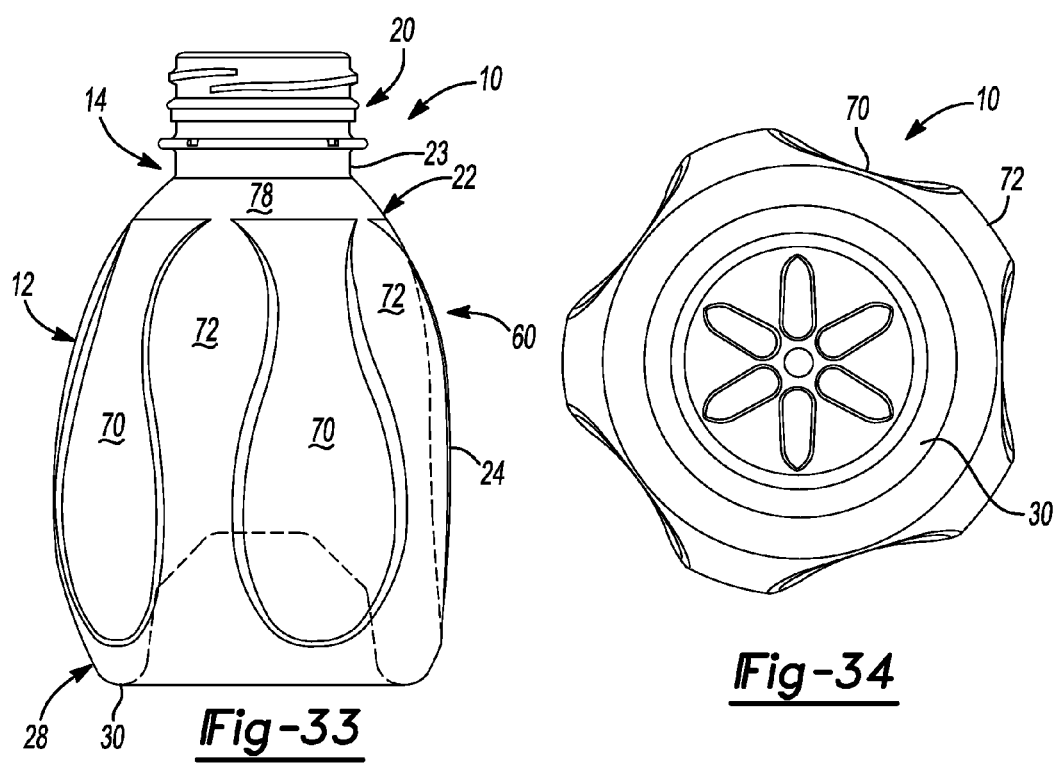
FIG. 33 is a front view of a plastic container constructed in accordance with some embodiments of the present disclosure.
FIG. 34 is a bottom view of the container of FIG. 33.

With particular reference to FIGS. 17-19, in some embodiments, container 10 can comprise generally flat or planar vacuum panels 70 being joined with adjacent, generally concave transition lands 72 (see as-blown configuration illustrated in FIG. 18). However, in response to hot-filling and the resultant internal vacuum forces, container 10 can collapse to absorb the internal vacuum forces, thereby resulting in, as illustrated in FIG. 19, concave vacuum panels 70 and generally planar transition lands 72. In this way, as a result of the collapsing process, vacuum panels 70 change from planar shaped to concaved shaped and transition lands 72 change from concaved shaped to planar shaped, when viewed in cross-section.

In some embodiments, vacuum panels 70 can extend upwardly and join a shoulder panel 74 along an edge 76. Shoulder panel 74 can be concave, sloped upwardly, and shaped generally in a semi-circle. Shoulder panel 74 can be set below lands 78 of shoulder portion 22, thereby resulting in an upstanding continuation of transition lands 72, generally indicated at 80. In some embodiments, upstanding continuation 80 can be similarly dimensioned as transition lands 72 to form a singular, vertically-oriented support rib of column 60.

Figure 5:
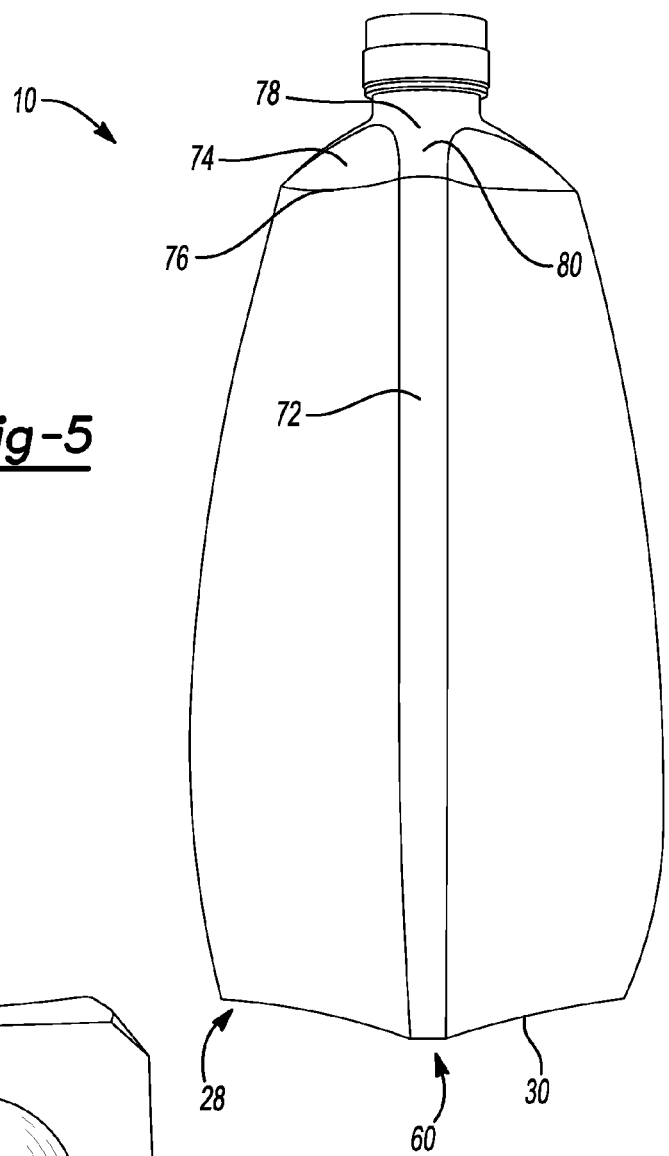
FIG. 5 is a front view of a plastic container constructed in accordance with additional embodiments of the present disclosure.

With particular reference to FIGS. 2, 4, and 6, base portion 28 can comprise a base 30. In some embodiments, base 30 can comprise a support surface 84 for supporting container 10 upon a shelf or tabletop. In some embodiments, as illustrated in FIGS. 1 and 2, support surface 84 can specifically include a ring portion 86 contactable with the shelf or tabletop and a remaining upswept surface portion 88 extending upwardly and outwardly to join sidewall portion 24. In some embodiments, upswept surface portion 88 is arcuately shaped such that it articulates upwardly in response to collapse of sidewall portion 24 during cooling. That is, as sidewall portion 24 contracts to a smaller diameter, upswept surface portion 88 can similarly collapse to a tighter upswept shape without the need to use a crease or folding edge in base 30, thereby resulting in a smooth and non-binding movement. In some embodiments, as seen in FIGS. 4-6, base 30 can comprise a substantially planar surface extending to and connected with sidewall portion 24. A pushup portion 90 can be centrally disposed within base portion 28 for additional accommodation of internal vacuum forces.

In some embodiments, as illustrated in FIGS. 1 and 2, base portion 28 can further comprise base panels 92 joining vacuum panels 70 along an edge 94. Base panels 92 can be concave, sloped downwardly and inwardly, and shaped generally in a semi-circle. Base panel 92 can be set below lands 96 of base portion 28, thereby defining an upstanding continuation of transition lands 72, generally indicated at 98. In some embodiments, upstanding continuation 98 can be similarly dimensioned as transition lands 72 to form a singular, vertically-oriented support rib of column 60.

In some embodiments, as illustrated in FIGS. 9-10, 12-13, transition panels 100 can be used to transition from vacuum panel 70 to adjacent structures or surfaces. For example, in some embodiments as illustrated in FIGS. 12-13, transition panels 100 can comprise a series of arcuate surfaces transitioning from a concave vacuum panel 70 to a generally circular body portion 12. Moreover, in some embodiments, vacuum panel 70 can comprise one or more additional vacuum features 71 (see FIG. 15) for controlled absorption of vacuum forces.

The plastic container 10 has been designed to retain a commodity. The commodity may be in any form such as a solid or semi-solid product. In one example, a commodity may be introduced into the container during a thermal process, typically a hot-fill process. For hot-fill bottling applications, bottlers generally fill the container 10 with a product at an elevated temperature between approximately 155° F. to 205° F. (approximately 68° C. to 96° C.) and seal the container 10 with a closure (not illustrated) before cooling. In addition, the plastic container 10 may be suitable for other high-temperature pasteurization or retort filling processes or other thermal processes as well. In another example, the commodity may be introduced into the container under ambient temperatures.

The plastic container 10 of the present disclosure is a blow molded, biaxially oriented container with a unitary construction from a single or multi-layer material. A well-known stretch-molding, heat-setting process for making the one-piece plastic container 10 generally involves the manufacture of a preform (not shown) of a polyester material, such as polyethylene terephthalate (PET), having a shape well known to those skilled in the art similar to a test-tube with a generally cylindrical cross section. An exemplary method of manufacturing the plastic container 10 will be described in greater detail later.

An exemplary method of forming the container 10 will be described. A preform version of container 10 includes a support ring, which may be used to carry or orient the preform through and at various stages of manufacture. For example, the preform may be carried by the support ring, the support ring may be used to aid in positioning the preform in a mold cavity, or the support ring may be used to carry an intermediate container once molded. At the outset, the preform may be placed into the mold cavity such that the support ring is captured at an upper end of the mold cavity. In general, the mold cavity has an interior surface corresponding to a desired outer profile of the blown container. More specifically, the mold cavity according to the present teachings defines a body forming region, an optional moil forming region and an optional opening forming region. Once the resultant structure, hereinafter referred to as an intermediate container, has been formed, any moil created by the moil forming region may be severed and discarded. It should be appreciated that the use of a moil forming region and/or opening forming region are not necessarily in all forming methods.

In one example, a machine (not illustrated) places the preform heated to a temperature between approximately 190° F. to 250° F. (approximately 88° C. to 121° C.) into the mold cavity. The mold cavity may be heated to a temperature between approximately 250° F. to 350° F. (approximately 121° C. to 177° C.). A stretch rod apparatus (not illustrated) stretches or extends the heated preform within the mold cavity to a length approximately that of the intermediate container thereby molecularly orienting the polyester material in an axial direction generally corresponding with the central longitudinal axis of the container 10. While the stretch rod extends the preform, air having a pressure between 300 PSI to 600 PSI (2.07 MPa to 4.14 MPa) assists in extending the preform in the axial direction and in expanding the preform in a circumferential or hoop direction thereby substantially conforming the polyester material to the shape of the mold cavity and further molecularly orienting the polyester material in a direction generally perpendicular to the axial direction, thus establishing the biaxial molecular orientation of the polyester material in most of the intermediate container. The pressurized air holds the mostly biaxial molecularly oriented polyester material against the mold cavity for a period of approximately two (2) to five (5) seconds before removal of the intermediate container from the mold cavity. This process is known as heat setting and results in a heat-resistant container suitable for filling with a product at high temperatures.

Alternatively, other manufacturing methods, such as for example, extrusion blow molding, one step injection stretch blow molding and injection blow molding, using other conventional materials including, for example, high density polyethylene, polypropylene, polyethylene naphthalate (PEN), a PET/PEN blend or copolymer, and various multi-layer structures may be suitable for the manufacture of plastic container 10. Those having ordinary skill in the art will readily know and understand plastic container manufacturing method alternatives.

According to the principles of the present teachings, container 10 is capable of providing a number of advantages not found in the prior art. Specifically, the principles of the present teachings provide a container having vertically oriented collapsible columns extending the length thereof that effectively absorb the internal vacuum while collapsing in overall size, which leads to increased hoop strength and top-loading capability. Unlike conventional containers, the collapse of the container 10 in response to internal vacuum forces can occur in the shoulder portion 22, sidewall portion 24, and base portion 28. In some embodiments, this collapse can be along continuous columns 60. This results in low or non residual vacuum inside the container after cooling, which decreases the risk of deformation, ovalization, denting, and other defects associated with the internal vacuum forces generated by hot-filled beverages. Moreover, the decrease in residual vacuum combined with the increase in top-load strength may lead to a reduction in thermoplastic material thickness and weight, providing a lower cost container to improve sustainability without sacrificing container performance.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A heat set container comprising:
   a base portion;
   a shoulder portion;
   a sidewall portion extending from said shoulder portion to said base portion, said shoulder portion, said sidewall portion and said base portion cooperating to define a receptacle chamber within said container into which product can be filled; and
   a plurality of vacuum panels equidistantly disposed about said sidewall portion; and
   a plurality of transition lands disposed between adjacent ones of said plurality of vacuum panels, each of said plurality of transition lands being spaced outwardly relative to said plurality of vacuum panels,
   wherein said plurality of vacuum panels and said plurality of transition lands cooperate to be inwardly collapsible from a first outside diameter to a second outside diameter in response to at least internal vacuum forces, said second diameter being less than said first diameter; and
   wherein each of said plurality of vacuum panels moves from a generally planar shape to a concave shape in response to vacuum forces and each of said plurality of transition lands moves from a concave shape to a generally planar shape in response to said vacuum forces when viewed in cross-section.

2. The heat set container according to claim 1 wherein each of said transition lands comprises a radiused cross-section, each of said transition lands varying from a first radius to a second radius in response to the vacuum forces, said second radius being smaller than said first radius.

3. The heat set container according to claim 1 wherein at least one of said plurality of vacuum panels and at least one of said plurality of transition lands defines a collapsible member, said collapsible member extending longitudinally along said sidewall and said shoulder portion.

4. The heat set container according to claim 1 wherein at least one of said plurality of vacuum panels and at least one of said plurality of transition lands defines a collapsible member, said collapsible member extending longitudinally along said sidewall and said base portion.

5. The heat set container according to claim 1 wherein at least one of said plurality of vacuum panels and at least one of said plurality of transition lands defines a collapsible member, said collapsible member extending longitudinally along said shoulder portion, said sidewall, and said base portion.

6. The heat set container according to claim 1 wherein said base portion comprises an upswept surface coupled to said sidewall portion, said upswept surface articulating upward in response to internal vacuum forces.

7. The heat set container according to claim 1 wherein each of said plurality of vacuum panels comprises a radiused cross-section, said vacuum panels varying from a first radius to a second radius in response to the vacuum forces, said second radius being smaller than said first radius.

* * * * *